United States Patent
Lee et al.

(10) Patent No.: US 9,467,267 B2
(45) Date of Patent: Oct. 11, 2016

(54) METHOD AND APPARATUS FOR PROXIMITY-BASED SERVICE BETWEEN MORE THAN TWO OPERATORS

(71) Applicant: LG ELECTRONICS INC., Seoul (KR)

(72) Inventors: Ki-Dong Lee, San Diego, CA (US); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 267 days.

(21) Appl. No.: 14/245,464

(22) Filed: Apr. 4, 2014

(65) Prior Publication Data

US 2014/0301307 A1   Oct. 9, 2014

Related U.S. Application Data

(60) Provisional application No. 61/809,234, filed on Apr. 5, 2013.

(51) Int. Cl.
*H04L 5/00* (2006.01)
*H04L 1/18* (2006.01)
*H04L 1/00* (2006.01)

(52) U.S. Cl.
CPC ........... *H04L 5/0055* (2013.01); *H04L 1/1887* (2013.01); *H04L 5/0028* (2013.01); *H04L 5/0092* (2013.01); *H04L 5/0035* (2013.01); *H04L 2001/0093* (2013.01)

(58) Field of Classification Search
CPC .... H04W 8/005; H04W 76/023; H04L 47/70
See application file for complete search history.

(56) References Cited

U.S. PATENT DOCUMENTS

| | | | |
|---|---|---|---|
| 2011/0258327 A1 | 10/2011 | Phan et al. | |
| 2011/0312331 A1 | 12/2011 | Hakola et al. | |
| 2012/0163278 A1 | 6/2012 | Chang et al. | |
| 2013/0083779 A1 | 4/2013 | Ahn et al. | |
| 2013/0203378 A1* | 8/2013 | Vos | H04W 4/24 455/406 |
| 2014/0031028 A1* | 1/2014 | Yamada | H04W 76/023 455/419 |
| 2014/0056220 A1* | 2/2014 | Poitau | H04W 40/246 370/328 |
| 2014/0243040 A1* | 8/2014 | Bienas | H04W 36/30 455/552.1 |
| 2015/0305070 A1* | 10/2015 | Ahmad | H04W 48/20 370/338 |

FOREIGN PATENT DOCUMENTS

WO    WO 2012/159270 A1    11/2012

* cited by examiner

*Primary Examiner* — Shaq Taha
(74) *Attorney, Agent, or Firm* — Birch, Stewart, Kolasch & Birch, LLP

(57) ABSTRACT

The present invention is directed to a method and an apparatus for use in a wireless communication system. Specifically, the present invention is directed to a method of setting up a ProSe connection by a ProSe-enabled UE of a first MNO in a cellular communication system and an apparatus therefore, in which the method comprises: broadcasting a first message including first resource allocation information for a first radio resource of the first MNO, wherein the first message is broadcast using a specific radio resource that is available to ProSe-enabled UEs of a second MNO; and receiving acknowledgement information regarding the first message from one or more ProSe-enabled UEs of the second MNO by using the first radio resource of the first MNO.

10 Claims, 10 Drawing Sheets

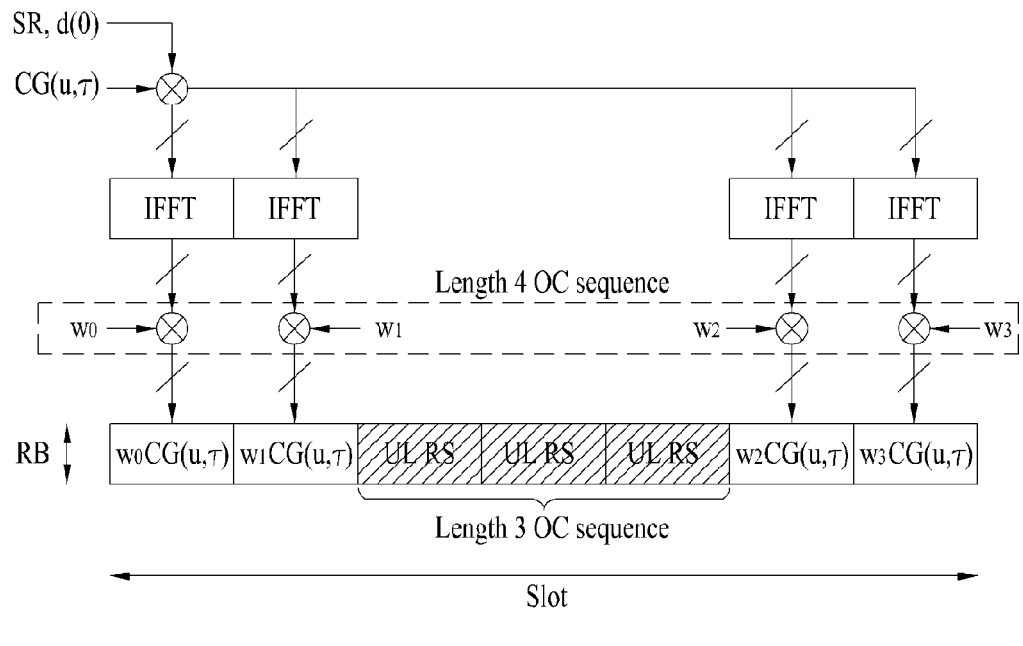
PUCCH format 1 structure (Normal CP)
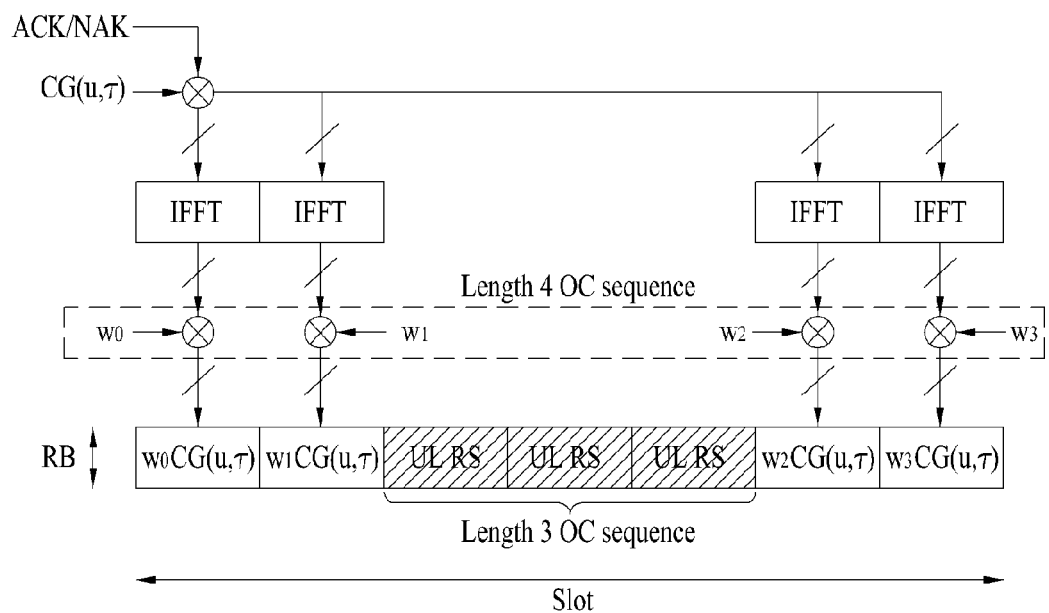
PUCCH format 1a and 1b structure (Normal CP case)

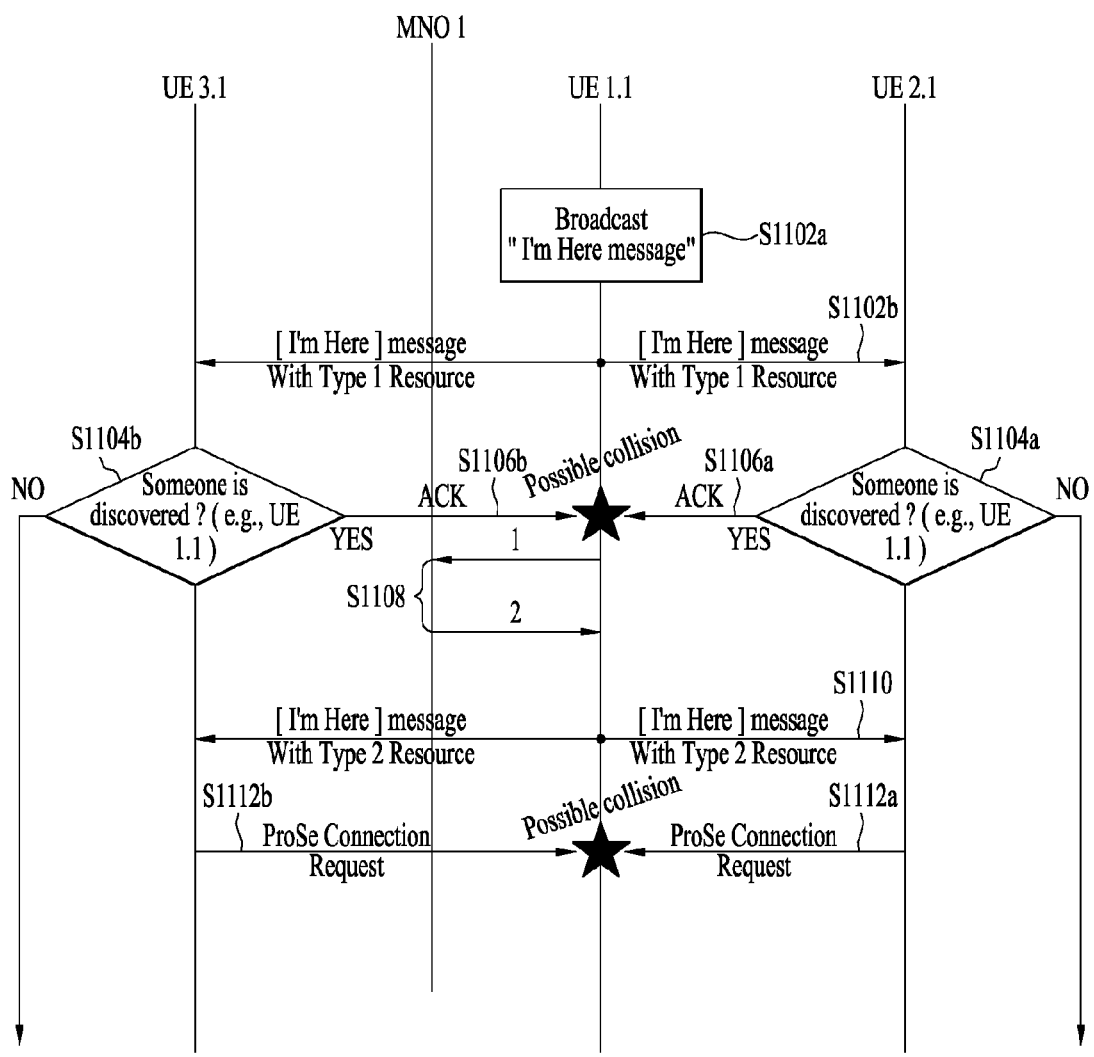

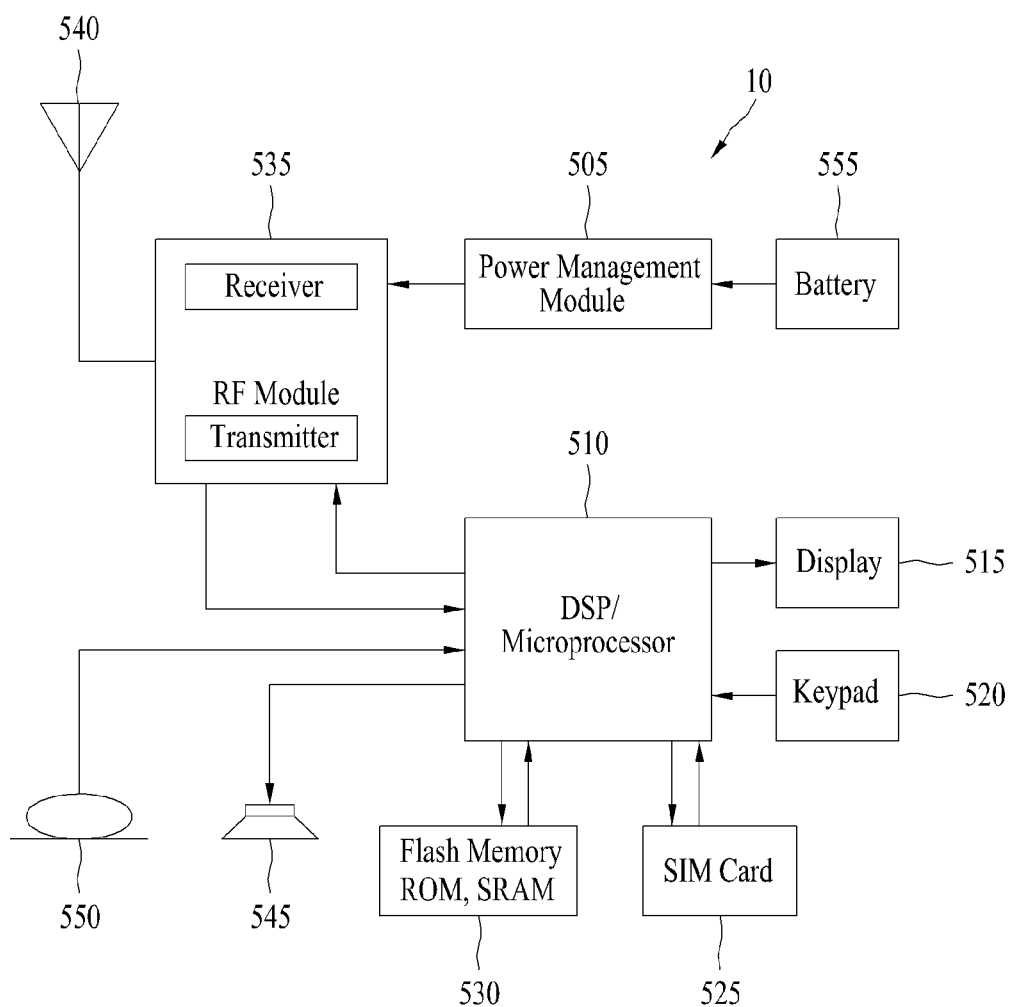

METHOD AND APPARATUS FOR PROXIMITY-BASED SERVICE BETWEEN MORE THAN TWO OPERATORS

Pursuant to 35 U.S.C. §119(e), this application claims the benefit of U.S. provisional application 61/809,234, filed on Apr. 5, 2013, which is hereby incorporated by reference as if fully set forth herein.

TECHNICAL FIELD

The present invention is directed to a method and an apparatus for use in a wireless communication system. Specifically, the present invention is directed to a method and an apparatus for proximity-based service.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and the like.

DISCLOSURE

Technical Problem

An object of the present invention is to provide a method and an apparatus of efficiently setup a Proximity-based Service (ProSe) connection, preferably a ProSe connection between ProSe-enabled devices served by different Public Land Mobile Networks (PLMNs).

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of setting up a Proximity-based Service (ProSe) connection by a ProSe-enabled UE of a first Mobile Network Operator (MNO) in a cellular communication system, the method comprising: broadcasting a first message including first, resource allocation information for a first radio resource of the first MNO, wherein the first message is broadcast using a specific radio resource that is available to ProSe-enabled UEs of a second MNO; and receiving acknowledgement information regarding the first message from one or more ProSe-enabled UEs of the second MNO by using the first radio resource of the first MNO.

Preferably, the first message may further include at least one of a maximum number of trials for the acknowledgement information and a back-off configuration for the acknowledgement information.

Preferably, if no collision is detected from the received acknowledgement information, the method may further comprise: broadcasting a second message including second resource allocation information for a second radio resource of the first MNO by using the specific radio resource; and receiving a ProSe connection request from the one or more ProSe-enabled UEs of the second MNO by using the second radio resource of the first MNO.

Preferably, the second message may further include identity information for a sender of the second message and identity information for the second MNO.

Preferably, the second message may further include at least one of a maximum number of trials for the ProSe connection request and a back-off configuration for the ProSe connection request.

Preferably, the first MNO may be different from the second MNO.

As another aspect of the invention, a ProSe-enabled UE of a first Mobile Network Operator (MNO) configured to set up a ProSe connection in a wireless communication system, the ProSe-enabled UE of the first MNO comprising: a radio frequency (RF) unit; and a processor, wherein the processor is configured to: broadcast a first message including first resource allocation information for a first radio resource of the first MNO, wherein the first message is broadcast using a specific radio resource that is available to ProSe-enabled UEs of a second MNO, and receive acknowledgement information regarding the first message from one or more ProSe-enabled UEs of the second MNO by using the first radio resource of the first MNO.

Preferably, the first message may further include at least one of a maximum number of trials for the acknowledgement information and a back-off configuration for the acknowledgement information.

Preferably, if no collision is detected from the received acknowledgement information, further processor may be further configured to: broadcast a second message including second resource allocation information for a second radio resource of the first MNO by using the specific radio resource, and receive a ProSe connection request from the one or more ProSe-enabled UEs of the second MNO by using the second radio resource of the first MNO.

Preferably, the second message may further include identity information for a sender of the second message and identity information for the second MNO.

Preferably, the second message may further include at least one of a maximum number of trials for the ProSe connection request and a back-off configuration for the ProSe connection request.

Preferably, the first MNO may be different from the second MNO.

Advantageous Effects

Exemplary embodiments of the present invention have the following effects. In accordance with the embodiments of the present invention, an efficient procedure for setting up a ProSe connection, preferably a ProSe connection between ProSe-enabled devices served by different networks is provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 7A~7B illustrate slot level structures of Physical Uplink Control Channel (PUCCH) formats 1/1a/1b.

FIGS. 10~11 show ProSe connection setup procedure in accordance with the present invention.

FIG. 12 shows a block diagram of a UE or Mobile Station (MS).

MODE FOR INVENTION

Reference will now be made in detail to the preferred embodiments of the present invention referring to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE—Advanced (LTE-A) is an evolved version of 3GPP LTE. Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
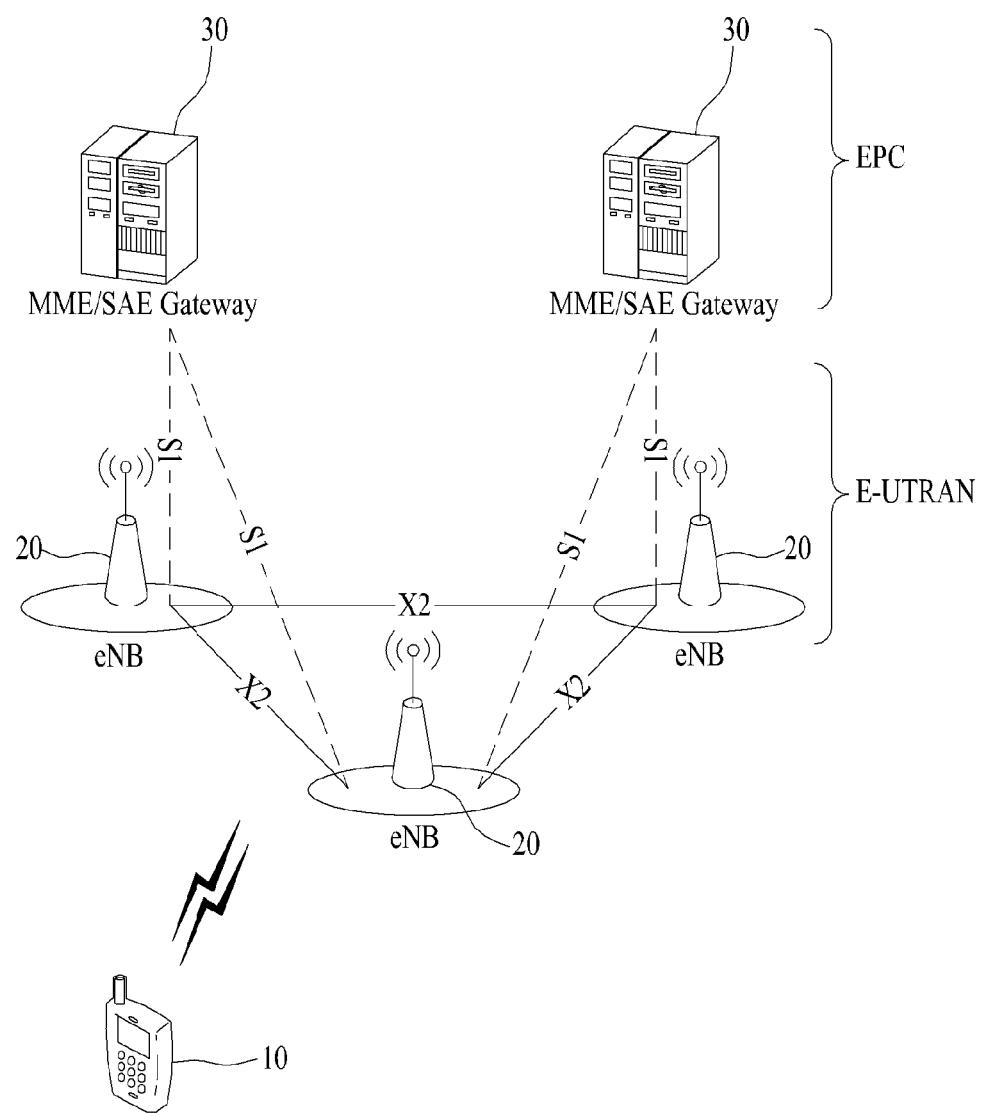
FIG. 1 shows a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downLink (DL)" refers to communication from the eNB 20 to the UE 10, and "UpLink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
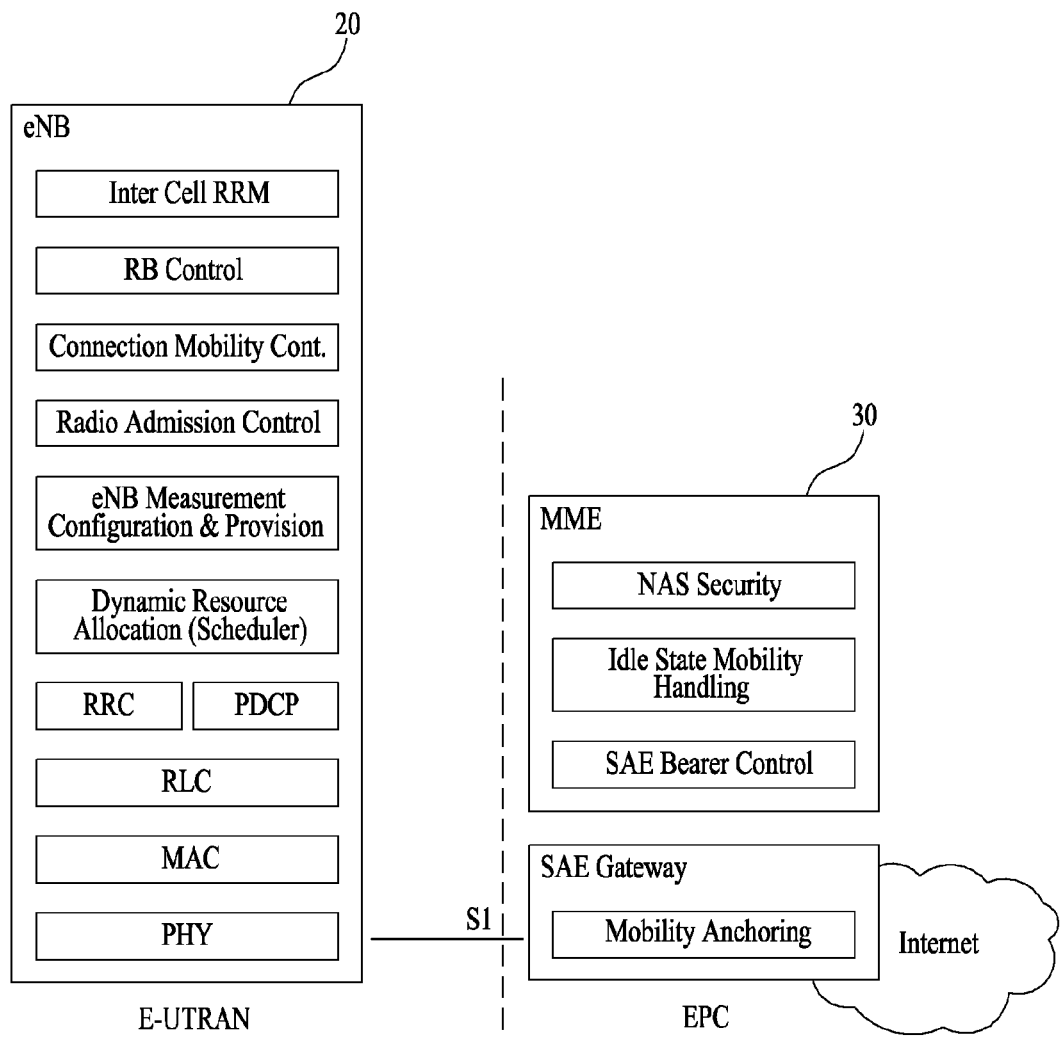
FIG. 2 shows a general structure of a typical E-UTRAN and that of a typical Evolved Packet Core (EPC).

FIG. 2 is a block diagram depicting general structures of an E-UTRAN and an EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE_ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
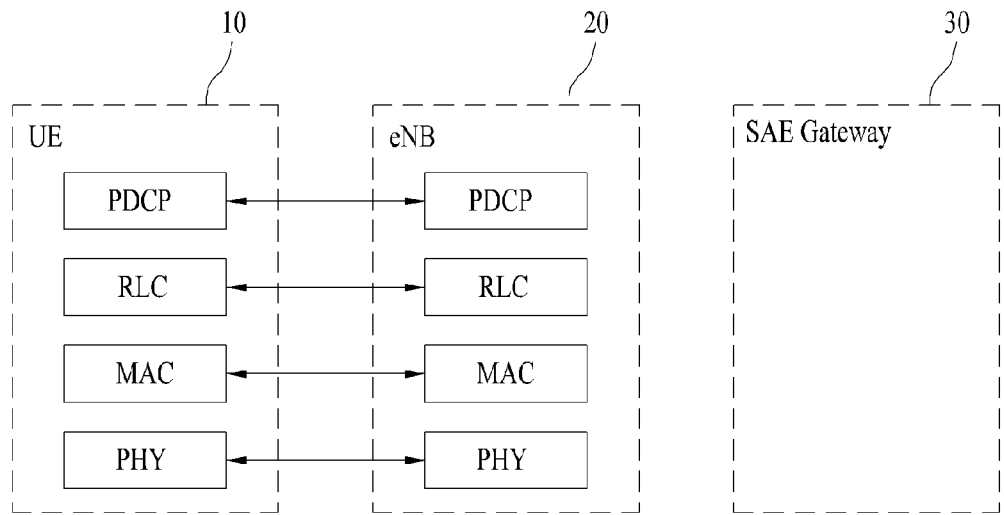
FIGS. 3A~3B show a user-plane protocol and a control-plane protocol stack for the E-UMTS network.
Figure 3B:
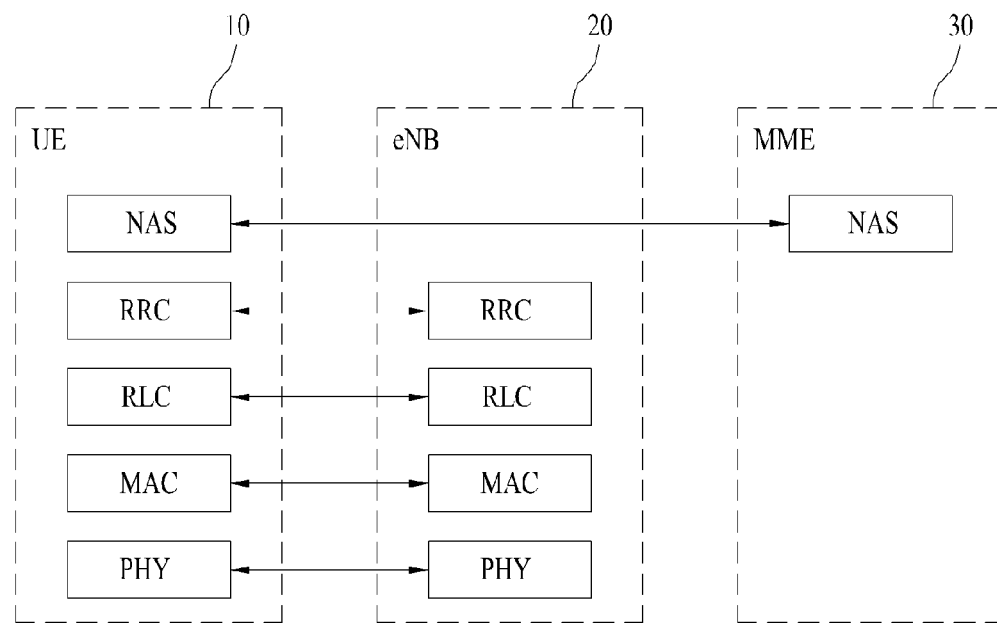

FIGS. 3A~3B illustrate the user-plane protocol and the control-plane protocol stack for the E-UMTS network. Referring to FIGS. 3A~3B, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3A~3B as being separate from the MAC layer, it is understood that the functions of the RLC layer may be performed by the MAC layer and that, therefore, a separate RLC layer is not required. Referring to FIG. 3A, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3B, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

Referring to FIG. 3A, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3B, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution—Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, and the network can control mobility (handover) of the UE.

Figure 4:
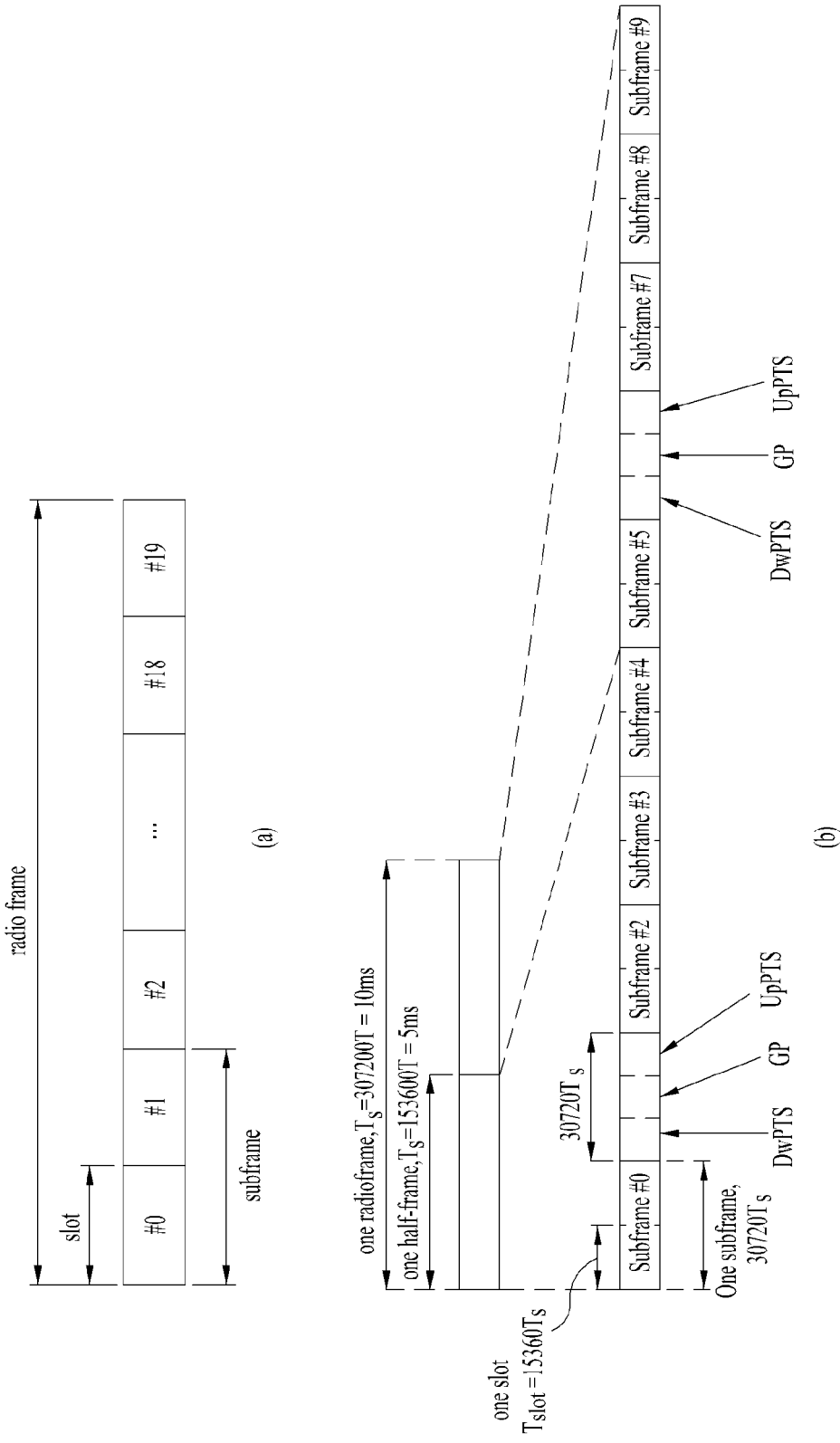
FIG. 4 shows a radio frame structure.

FIG. 4 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure for FDD (Frequency Division Duplex) and a type-2 radio frame structure for TDD (Time Division Duplex).

FIG. 4(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. When an OFDM symbol is configured with a normal CP, for example, the number of OFDM symbols included in one slot may be 7. When an OFDM symbol is configured with an extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 4(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS). The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

Figure 5:
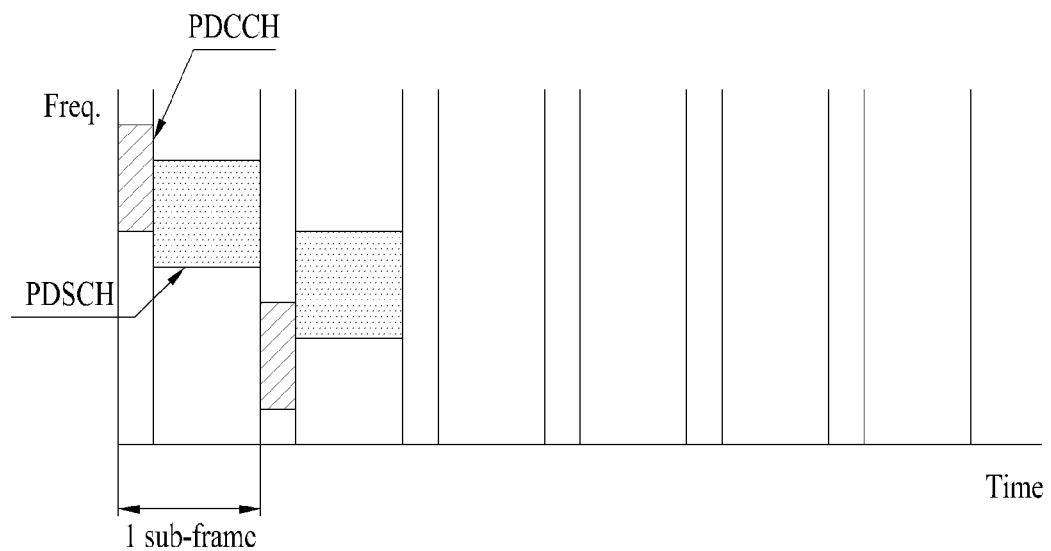
FIG. 5 shows a downlink subframe and physical channels.

FIG. 5 illustrates a downlink subframe and physical channels.

Referring to FIG. 5, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE(-A), for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

Figure 6:
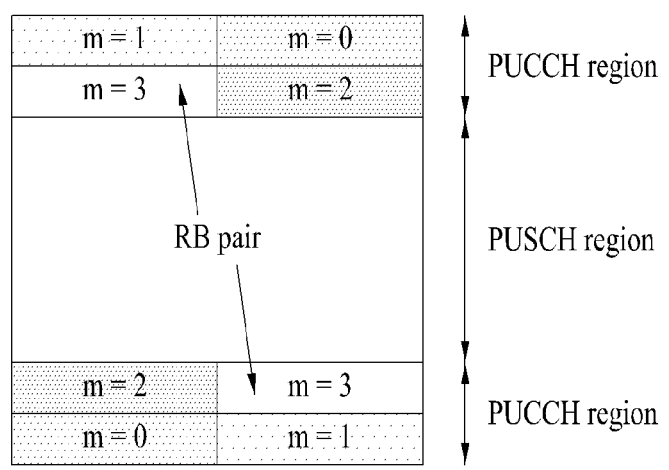
FIG. 6 shows an uplink subframe and physical channels.

FIG. 6 illustrates a structure of a UL subframe.

Referring to FIG. 5, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The UL control information (that is, UCI) includes HARQ ACK/NACK, Channel Quality Information (CQI), Precoding Matrix Indicator (PMI) and Rank Indication (RI).

FIGS. 7A~7B show a slot level structures of a PUCCH format 1/1a/1b. FIG. 7A shows PUCCH format 1, which 1 is used to transmit Scheduling Request (SR). SR is used to request an UL-SCH resource. SR information is carried by the presence/absence of transmission of PUCCH from the UE (i.e., On-Off keying (OOK) modulation). FIG. 7B shows PUCCH format 1a/1b, which 1 is used to transmit Hybrid Automatic Repeat reQuest Acknowledgement (HARQ-ACK) (or, Acknowledgement/Negative Acknowledgement (ACK/NAK)) in response to receipt of downlink data(s) (e.g., PDSCH signal). PUCCH format 1a carries 1-bit HARQ-ACK (e.g., Binary Phase Shift Keying (BPSK) modulation), and PUCCH format 1b carries 2-bit HARQ-ACK (e.g., Quadrature Phase Shift Keying (QPSK) modulation).

Referring to FIG. 7A~7B, the same structure is used for PUCCH format 1/1a/1b, in which the same control information is repeated within a subframe in slot units. Each UE transmits an PUCCH format 1/1a/1b signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes). The OC includes, for example, a Walsh/DFT orthogonal code. If the number of CSs is 6 and the number of OCs is 3, a total of 18 UEs may be multiplexed in a PRB in the case of using a single antenna. Orthogonal sequences w0, w1, w2 and w3 may be applied in a certain time domain (after FFT modulation) or a certain frequency domain (before FFT modulation). PUCCH format 1/1a/1b resources including CSs, OCs and PRBs may be provided to a UE through radio resource control (RRC).

Specifically, when the SR is triggered or pending in a SR subframe, a complex-valued symbol d(0)=1 is used. And, when the ACK/NAK needs to be transmitted, a complex-valued symbol d(0) is generated by modulating HARQ-ACK response(s) in accordance with BPSK or QPSK schemes. The complex-valued symbol d(0) may be multiplied with a cyclically shifted length $N_{seq}^{PUCCH}=12$ sequence $r_{u,v}^{(\alpha_{\tilde{p}})}(n)$ for each of the P antenna ports used for PUCCH transmission according to $$y^{(\tilde{p})}(n) = \frac{1}{\sqrt{P}} d(0) \cdot r_{u,v}^{(\alpha_{\tilde{p}})}(n), n = 0, 1, \ldots, N_{seq}^{PUCCH} - 1$$

where $r_{u,v}^{(\alpha_{\tilde{p}})}(n)$ is the CG-CAZAC sequence with $N_{seq}^{PUCCH}=12$. The antenna-port specific cyclic shift $\alpha_{\tilde{p}}$ varies between symbols and slots as defined below.

The block of complex-valued symbols $y^{(\tilde{p})}(0), \ldots, y^{(\tilde{p})}(N_{seq}^{PUCCH}-1)$ may be scrambled by $S(n_s)$ and block-wise spread with the antenna-port specific orthogonal sequence $w_{n_{oc}^{(\tilde{p})}(i)}$ according to $$z^{(\tilde{p})}(m' \cdot N_{SF}^{PUCCH} \cdot N_{seq}^{PUCCH} + m \cdot N_{seq}^{PUCCH} + n) = S(n_s) \cdot w_{n_{oc}^{(\tilde{p})}}(m) \cdot y^{(\tilde{p})}(n)$$

where $m = 0, \ldots, N_{SF}^{PUCCH} - 1$ $n = 0, \ldots, N_{seq}^{PUCCH} - 1$, and $m' = 0, 1$ $$S(n_s) = \begin{cases} 1 & \text{if } n'_{\tilde{p}}(n_s) \bmod 2 = 0 \\ e^{j\pi/2} & \text{otherwise} \end{cases}$$

with $N_{SF}^{PUCCH}=4$ for both slots of normal PUCCH format 1/1a/1b, and $N_{SF}^{PUCCH}=4$ for the first slot and $N_{SF}^{PUCCH}=3$ for the second slot of shortened PUCCH format 1/1a/1b. The sequence $$w_{n_{oc}^{(\tilde{p})}}(i)$$

is given by Table 1 and Table 2. $n_{\tilde{p}}(n_s)$ is defined later.

TABLE 1

| Sequence index $n_{oc}^{(\tilde{p})}(n_s)$ | Orthogonal sequences $[w(0) \ldots w(N_{SF}^{PUCCH} - 1)]$ |
| --- | --- |
| 0 | [+1 +1 +1 +1] |
| 1 | [+1 −1 +1 −1] |
| 2 | [+1 −1 −1 +1] |

TABLE 2

| Sequence index $n_{oc}^{(\tilde{p})}(n_s)$ | Orthogonal sequences $[w(0) \ldots w(N_{SF}^{PUCCH} - 1)]$ |
| --- | --- |
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Resources used for transmission of PUCCH format 1/1a/1b are identified by a resource index $n_{PUCCH}^{(1,\tilde{p})}$ from which the orthogonal sequence index $n_{oc}^{(\tilde{p})}(n_s)$ and the cyclic shift $\alpha_{\tilde{p}}(n_s,l)$ are determined according to following equations. Fop PUCCH format 1, $n_{PUCCH}^{(1,\tilde{p})}$ is semi-statically provided by a higher layer (e.g., RRC). For PUCCH format 1a/1b, $n_{PUCCH}^{(1,\tilde{p})}$ is semi-statically provided by a higher layer (e.g., RRC) or dynamically provided by using a resource index (e.g., a lowest Control Channel Element (CCE) index) used for a transmission of DL grant PDCCH signal corresponding to a PDSCH signal.

$$n_{oc}^{(\tilde{p})}(n_s) = \begin{cases} \lfloor n'_{\tilde{p}}(n_s) \cdot \Delta_{shift}^{PUCCH}/N' \rfloor & \text{for normal cyclic prefix} \\ 2 \cdot \lfloor n'_{\tilde{p}}(n_s) \cdot \Delta_{shift}^{PUCCH}/N' \rfloor & \text{for extended cyclic prefix} \end{cases}$$

$$\alpha_{\tilde{p}}(n_s, l) = 2\pi \cdot n_{cs}^{(\tilde{p})}(n_s, l)/N_{sc}^{RB}$$

$$n_{cs}^{(\tilde{p})}(n_s, l) = \begin{cases} \left[\left(n_{cs}^{cell}(n_s, l) + \begin{pmatrix} n'_{\tilde{p}}(n_s) \cdot \Delta_{shift}^{PUCCH} + \\ (n_{oc}^{(\tilde{p})}(n_s) \bmod \Delta_{shift}^{PUCCH}) \end{pmatrix} \bmod N' \right] \bmod N_{sc}^{RB} & \text{for normal cyclic prefix} \\ \left[\left(n_{cs}^{cell}(n_s, l) + \begin{pmatrix} n'_{\tilde{p}}(n_s) \cdot \Delta_{shift}^{PUCCH} + \\ n_{oc}^{(\tilde{p})}(n_s)/2 \end{pmatrix} \bmod N' \right] \bmod N_{sc}^{RB} & \text{for extended cyclic prefix} \end{cases}$$

where $$N' = \begin{cases} N_{cs}^{(1)} & \text{if } n_{PUCCH}^{(1,\tilde{p})} < c \cdot N_{cs}^{(1)}/\Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

$$N_{sc}^{RB} = 12$$

A cell-specific cyclic shift, $n_{sc}^{cell}(n_s,l)$, which varies with the symbol number l and the slot number $n_s$ according to $$n_{cs}^{cell}(n_s, l) = \sum_{i=0}^{7} c(8 N_{symb}^{UL} \cdot n_s + 8l + i) \cdot 2^i$$

where $c(\cdot)$ is a pseudo-random sequence.

The pseudo-random sequence may be defined by a length-31 Gold sequence. The output sequence $c(n)$ of length $M_{PN}$, where $n = 0, 1, \ldots, M_{PN}-1$, may be defined by $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

where $N_C = 1600$ and the first m-sequence is initialized with $x_1(0)=1$, $x_1(n)=0$, $n=1, 2, \ldots, 30$. The initialization of the second m-sequence is denoted by $c_{init} = \sum_{i=0}^{30} x_2(i) \cdot 2^i$. For PUCCH format 1/1a/1b, the pseudo-random sequence may be initialized with $c_{init} = N_{ID}^{cell}$ at the beginning of each radio frame. $N_{ID}^{cell}$ is a physical layer cell identity (Cell ID).

The resource indices within the two resource blocks in the two slots of a subframe to which the PUCCH is mapped are given by $$n'_{\tilde{p}}(n_s) = \begin{cases} n_{PUCCH}^{(1,\tilde{p})} & \text{if } n_{PUCCH}^{(1,\tilde{p})} < c \cdot N_{cs}^{(1)}/\Delta_{shift}^{PUCCH} \\ \left( \frac{n_{PUCCH}^{(1,\tilde{p})} - c \cdot}{N_{cs}^{(1)}/\Delta_{shift}^{PUCCH}} \right) \bmod(c \cdot N_{sc}^{RB}/\Delta_{shift}^{PUCCH}) & \text{otherwise} \end{cases}$$

for $n_s \bmod 2 = 0$ and by $$n'_{\tilde{p}}(n_s) = \begin{cases} [c(n'_{\tilde{p}}(n_s - 1) + 1)] \bmod(c N_{sc}^{RB}/\Delta_{shift}^{PUCCH} + 1) - 1 & n_{PUCCH}^{(1,p)} \geq c \cdot N_{cs}^{(1)}/\Delta_{shift}^{PUCCH} \\ \lfloor h_p/c \rfloor + (h_p \bmod c) N'/\Delta_{shift}^{PUCCH} & \text{otherwise} \end{cases}$$

for $n_s$ mod $2=1$, where $h_p=(n'_p(n_s-1)+d) \mod(cN'/\Delta_{shift}^{PUCCH})$, with $d=2$ for normal CP and $a'=0$ for extended CP.

The parameters deltaPUCCH-Shift $\Delta_{shift}^{PUCCH}$ is provided by higher layers.

The block of complex-valued symbols $z^{(\tilde{p})}(i)$ may be multiplied with the amplitude scaling factor $\beta_{PUCCH}$ in order to conform to the transmit power $P_{PUCCH}$, and mapped in sequence starting with $z^{(\tilde{p})}(0)$ to resource elements. PUCCH uses one resource block in each of the two slots in a subframe. Within the physical resource block used for transmission, the mapping of $z^{(\tilde{p})}(i)$ to resource elements (k,l) on antenna port p and not used for transmission of reference signals may be in increasing order of first k, then l and finally the slot number, starting with the first slot in the subframe.

Proximity-Based Service (ProSe)

Recently, Proximity-based Service (ProSe) has been discussed in 3GPP. The ProSe enables different UEs to be connected (directly) each other (after appropriate procedure(s), such as a ProSe discovery, an authentication), through eNB only (but not further through Serving Gateway (S-GW, SGW)/Packet Data Network Gateway (PDN-GW, P-GW, PGW)), or through SGW/PGW (S/P-GW). The ProSe has various use cases and potential requirements for a network controlled discovery and communications between wireless devices that are in proximity, under continuous network control, and are under a 3GPP network coverage, for:

Commercial/social use
Network offloading
Public Safety
Integration of current infrastructure services, to assure the consistency of the user experience including reachability and mobility aspects
Public Safety, in case of absence of EUTRAN coverage (subject to regional regulation and operator policy, and limited to specific public-safety designated frequency bands and terminals)

Figure 8:
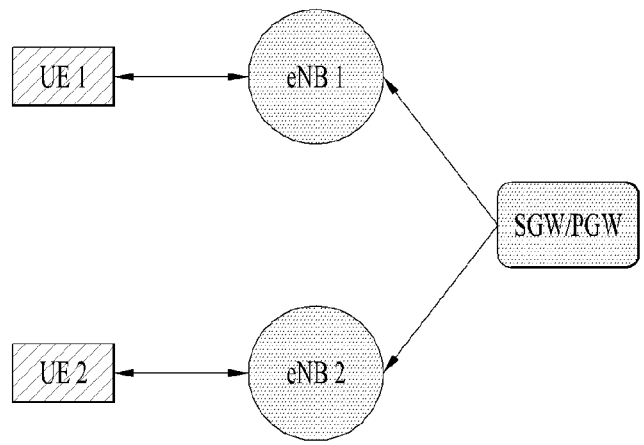
FIGS. 8, 9A and 9B show three types of communication paths that can be used in ProSe.
Figure 9A:
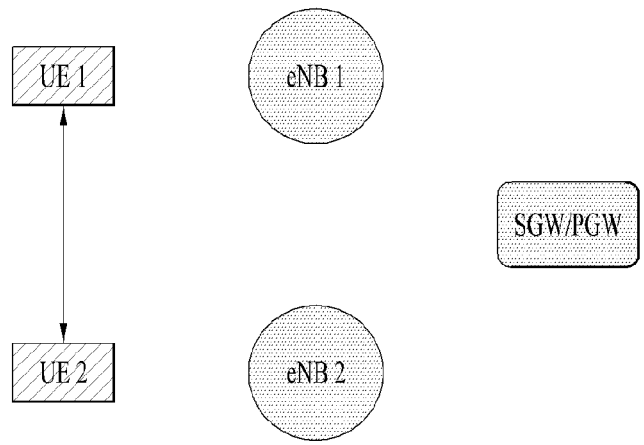
Figure 9B:
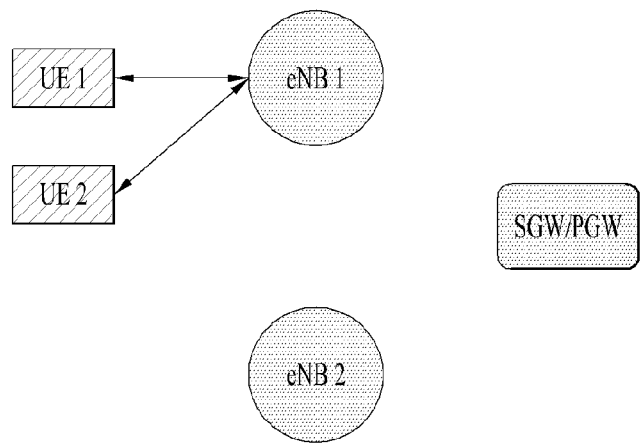

FIGS. 8, 9A and 9B show three types of communication paths that can be used in ProSe. FIG. 8 shows the EPC Path established by the ProSe Discovery, and FIGS. 9A and 9B show two types of ProSe Communication path.

FIG. 8 shows an example of default data path (or Enhanced Packet Core (EPC) Path) in an Enhanced Packet System (EPS) for communication between two UEs. Referring to FIG. 8, even when two UEs (e.g., UE1, UE2) in close proximity communicate with each other, their data path (user plane) goes via the network. Thus the default data path for the communication involves eNB(s) and/or Gateway(s) (GW(s)) (e.g., SGW/PGW). The network may further include a network node related with the ProSe communication such as a ProSe server, a MME, and the like (hereinafter, ProSe-related node). The ProSe-related node may control a ProSe communication via the data path. The ProSe-related node may be a part of the data path or may be located out of the data path.

FIGS. 9A~9B shows another examples of data path scenarios for a proximity communication between two UEs. FIG. 9A shows a direct mode data path in the EPS for communication between two UEs. FIG. 9B shows a locally-routed data path in the EPS for communication between two UEs when the UEs are served by the same eNB. In particular, if wireless devices (e.g., UE1, UE2) are in proximity of each other, they may be able to use a direct mode data path (FIG. 9A) or a locally routed data path (FIG. 9B). In the direct mode data path, wireless devices are connected directly each other (after appropriate procedure(s), such as a ProSe discovery, an authentication), without eNB and SGW/PGW. In the locally routed data path, wireless devices are connected each other through eNB only.

In an Inter-Mobile Network Operator (MNO) ProSe communication, MNOs share ProSe radio resources (e.g., frequency band(s), channels) and related control information with each other, so that another MNO (e.g., MNO1) cannot miss the scanning of different MNO's (e.g., MNO2's) ProSe radio resources in providing ProSe services. It is up to the operator's decision which radio resources it will use for ProSe discovery and communication. However, when it comes to Inter-MNO scenario, UEs served by one MNO shall be able to know which radio resources is used by the other MNO(s) so that the first can plan which radio resources to scan to perform a ProSe discovery. Furthermore, if a Discoverer UE (or Discovering UE) wants to make a ProSe communication link with a discoveree UE, it is necessary to determine whose radio resources (e.g., MNO1's frequency band or channel or MNO2's frequency band or channel), is proper to use and to determine how to set up a ProSe communication link.

Hereinafter, a procedure for a ProSe connection setup between ProSe-enabled devices served by different networks (e.g., different MNOs) will be explained. For easy understanding, the present invention will be explained mostly about a scenario that UEs of two MNO are involved in the ProSe connection setup, but the present invention can be used for a scenario that UEs of three or more MNOs are involved in the ProSe connection setup. In the following explanation, UEx.y means the UE y served by MNO x (e.g., UE2.1: UE 1 of MNO2).

Figure 10:
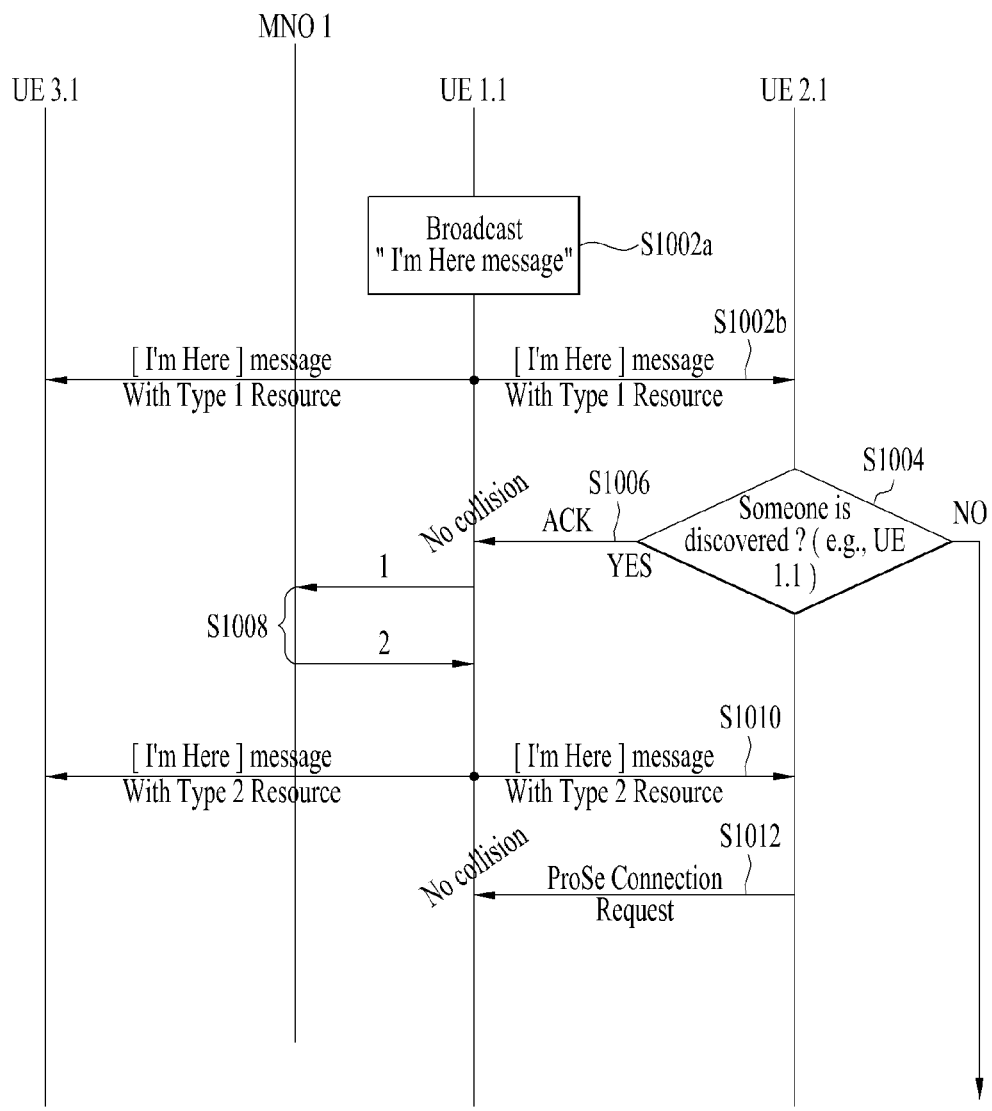

FIG. 10 shows a procedure for Inter-MNO ProSe connection setup in accordance with the present invention. FIG. 10 shows a case that a single UE is attempting the Inter-MNO ProSe connection setup.

Referring to FIG. 10, UE1.1 may broadcast "I'm Here" message (hereinafter, broadcast msg1) (S1002a or S1002b). The broadcast msg1 may be used to announce a presence of a ProSe-enabled UE (e.g., UE1.1) to ProSe-enabled UEs of other MNOs (e.g., UE2.1 or UE3.1). The broadcast msg1 may be transmitted using newly defined system information for ProSe (e.g., ProSe-SIB), and the like. The broadcast msg1 may be scrambled using a MNO-common scrambling sequence. For example, the MNO-common scrambling sequence may be initialized by a newly defined MNO-common identifier (ID), a ProSe-related ID which is common between MNOs, and the like. The broadcast msg1 may be transmitted using a specific radio resource that is available to ProSe-enabled UEs of other MNOs (e.g., UE2.1 or UE3.1). The specific radio resource may be selected from MNO-common resources. The MNO-common resources may be frequency bands/channels which are shared between MNOs based on an inter-MNO negotiation or a technical standard, and the like. The specific radio resource may be selected from the MNO-common resources randomly or in accordance with a certain rule. For example, a frequency band/channel index corresponding to the specific radio resource may be determined based on a MNO ID (e.g., MNO1's ID), a UE ID (e.g., UE1.1's ID), a ProSe group ID or a ProSe service ID. The broadcast msg1 message may be transmitted in accordance with a periodic transmission cycle (e.g., N (N≥1) radio frame(s)) and an offset (in unit of ms or subframe) during a procedure related to the broadcast msg1 is pending. The offset for transmission of the broadcast msg1 may be determined based on a MNO ID (e.g., MNO1's ID), a UE ID (e.g., UE1.1's ID), a ProSe group ID or a ProSe service ID.

As a result of broadcast msg1 transmission, if UE1.1 is discovered by a ProSe-enabled UE (e.g., UE2.1) of another MNO (e.g., MNO2) (S1004), UE2.1 may transmit a certain message (hereinafter, response msg1) to the discoveree UE (e.g., UE1.1) (S1006). The response msg1 from UE2.1 may be scrambled by using a MON1-related ID (e.g., MNO1 ID). The response msg1 may include Acknowledgement (ACK) information about the broadcast msg1. For example, the response msg1 may include a simplified ACK with basic and minimal level of information. Here, the simplified ACK may be used to inform the discoveree UE (e.g., UE1.1) of a presence of discoverer UE(s). The minimal level of information may include a logical or physical ID of the discoverer UE (e.g., UE2.1) and/or a logical or physical ID of MNO (e.g., MNO2).

The response msg1 may be transmitted using (radio) resource(s) (hereinafter, Type 1 resource). Type 1 resource may include resource(s) for a discoverer UE (e.g., UE2.1 or UE3.1) of a first MNO(s) (hereinafter, neighboring MNO), which is reserved/allocated by a second MNO (hereinafter, serving MNO) or a discoveree UE (e.g., UE1.1) of the second MNO. If needed by any reason, such as MNO's policy or scare of resources in an MNO, the serving MNO (e.g., MNO1) can request a negotiation to the neighboring MNO (e.g., MNO2) of the other UE (e.g., UE2.1) so that resource (e.g., frequency band/channel) switch-over can be made onto resources of the neighboring MNO (e.g., MNO2). Type 1 resource may include resource(s) for a simplified ACK with basic and minimal level of information. In view of UE2.1, Type 1 resource may be allocated by using any one of following methods:

Method A1: MNO (e.g., MNO1 or MNO2) may broadcast resource allocation information indicating Type 1 resource using SIB or something similar to this (in case of S1002a). For example, MNO may broadcast relative information (e.g., time information, frequency information, and so on, which are relative to the resource used for transmission of the broadcast msg1) using the SIB or something similar to this.

Method A2: "I'm Here" ProSe UE (e.g., UE1.1) may broadcast resource allocation information indicating Type 1 resource using ProSe-SIB or something similar to this (in case of S1002b). The ProSe-SIB may contain a logical or physical ID of the UE (e.g., UE1.1) and local system (e.g., MNO1) information (e.g., a logical or physical ID of the MNO1) for the other discovering ProSe UE(s) (e.g., UE2.1) to use. For example, UE1.1 may broadcast relative information (e.g., time information, frequency information, and so on, which are relative to the resource used for transmission of the broadcast msg1) using the ProSe-SIB or something similar to this.

Method A3: Combination of Method A1 and Method A2 in the time domain.

Here, the relative time information may be represented as a subframe offset from a subframe on which the broadcast msg1 is transmitted/received. The relative frequency information may be represented as a frequency band index offset, a channel index offset or a resource block (group) index offset from a frequency band/channel index through which the broadcast msg1 is transmitted/received.

The response msg1 may be transmitted using PUCCH format 1/1a/1b, and the Type 1 resource may include PUCCH format 1/1a/1b resources. For example, UE2.1 may transmit an ACK signal to UE1.1 through PUCCH format 1/1a/1b. In this case, UE ID and/or MNO ID may be used in cyclic shifting CG-CAZAC sequence used for PUCCH format 1/1a/1b transmission. In particular, as explained referring to FIGS. 7A~7B, in the conventional arts, the cyclic shift, $n_{cs}^{cell}(n_s,l)$ varies with the symbol number l and the slot number $n_s$ according to $$n_{cs}^{cell}(n_s,l)=\Sigma_{i=0}^{7}c(8N_{symb}^{UL}\cdot n_s+8l+i)\cdot 2^i$$

where $c(\cdot)$ is a pseudo-random sequence. The pseudo-random sequence generator may be initialized with $c_{init}=N_{ID}^{cell}$ at the beginning of each radio frame. $N_{ID}^{cell}$ is a physical layer cell identity (Cell ID).

In the present example, the Cell ID may be replaced with at least one of UE ID and/or MNO ID (e.g., UE2.1 ID and/or MNO2 ID). For example, $c_{init}$ may be set to UE2.1 ID, MNO2 ID, UE2.1 ID*$2^n$+MNO2 ID or MNO2 ID*$2^m$+UE2.1 ID. Here, n is a bit size of MNO ID, and m is a bit size of UE ID.

After UE2.1 discovers a UE (e.g., UE1.1) of another MNO (e.g., MNO1), UE2.1 may transmit a ProSe connection request to UE1.1 (S1012). The ProSe connection request may be transmitted using (radio) resource(s) (hereinafter, Type 2 resource). Type 2 resource may include resource(s) for a discoverer UE (e.g., UE2.1 or UE3.1) of a first MNO(s) (hereinafter, neighboring MNO), which is reserved/allocated by a second MNO (hereinafter, serving MNO) or a discoveree UE (e.g., UE1.1) of the second MNO. If needed by any reason, such as MNO's policy or scare of resources in an MNO, the serving MNO (e.g., MNO1) can request a negotiation to the neighboring MNO (e.g. MNO2) of the other UE (e.g., UE2.1) so that resource (e.g., frequency band/channel) switch-over can be made onto resources of the neighboring MNO. Type 2 resource may include resource(s) for an enhanced level of message (e.g., the ProSe connection request), and thus Type 2 resource may be allocated to be larger than Type 1 resource. In view of UE2.1, Type 2 resource may be allocated by using any one of following methods:

Method B1: MNO (e.g., MNO1 or MNO2) may broadcast resource allocation information indicating Type 2 resource using SIB or something similar to this (in case of S1002a). For example, MNO may broadcast relative information (e.g., time information, frequency information, and so on, which are relative to the resource used for transmission of the broadcast msg1) using the SIB or something similar to this.

Method B2: "I'm Here" ProSe UE (e.g., UE1.1) may broadcast resource allocation information indicating Type 2 resource using ProSe-SIB or something similar to this (in case of S1010). The ProSe-SIB may contain a logical or physical ID of the UE (e.g., UE1.1) and local system (e.g., MNO1) information (e.g., a logical or physical ID of the MNO1) for the other discovering ProSe UE(s) (e.g., UE2.1) to use. For example, UE1.1 may broadcast relative information (e.g., time information, frequency information, and so on, which are relative to the resource used for transmission of the broadcast msg1) using the ProSe-SIB or something similar to this.

Method B3: Combination of Method A1 and Method A2 in the time domain.

Here, the relative time information may be represented as a subframe offset from a subframe on which the broadcast msg1 (or the response msg1) is transmitted/received. The relative frequency information may be represented as a frequency band index offset, a channel index offset or a resource block (group) index offset from a frequency band/channel index through which the broadcast msg1 (or the response msg1) is transmitted/received.

If Type 2 resource is allocated based on Method B1, Step S1008~S1010 may be omitted. Meanwhile, if Type 2 resource is allocated based on Method B1/B2, Step S1008~S1010 may performed as follows. Specifically, after UE1.1 receives the response msg1 (e.g., ACK) from a ProSe-enabled UE (e.g., UE2.1) of another MNO (e.g., MNO2), if needed, UE1.1 may request more resources to use, to its Home Public Land Mobile Network (HPLMN) or Visited Public Land Mobile Network (VPLMN) MNO (e.g., MNO1), and the HPLMN or VPLMN WINO may assigns the requested resources to UE1.1 (S1008).

Then, UE1.1 may broadcast "I'm Here" message (hereinafter, broadcast msg2) (S1010). The broadcast msg2 may include information Type 2 resource) for ProSe-enabled UEs (e.g., UE2.1, UE3.1) of neighboring MNOs (e.g., MNO2, MNO3). Type 2 resource may be used for UE2.1 to transmit a message for requesting a ProSe connection to UE1.1. If needed by any reason, such as MNO's policy or scare of resources in an MNO, the serving MNO (e.g., MNO1) can request a negotiation to the neighboring MNO (e.g., MNO2) of the other UE (e.g., UE2.1) so that resource (e.g., frequency band/channel) switch-over can be made onto resources of the neighboring MNO.

The broadcast msg2 may be transmitted using newly defined system information for ProSe (e.g., ProSe-SIB), and the like. The broadcast msg1 may be scrambled using a MNO-common scrambling sequence. For example, the MNO-common scrambling sequence may be initialized by a newly defined MNO-common identifier (ID), a ProSe-related ID which is common between MNOs, and the like. If the response msg1 includes a logical or physical ID of the discoverer UE (e.g., UE2.1) and/or a logical or physical ID of MNO (e.g., MNO2), the broadcast msg2 may be scrambled using the logical or physical ID of the discoverer UE (e.g., UE2.1) and/or the logical or physical ID of MNO (e.g., MNO2). The broadcast msg2 may be transmitted using a specific radio resource that is available to ProSe-enabled UEs of other MNOs (e.g., UE2.1 or UE3.1). The specific radio resource may be selected from MNO-common resources. The MNO-common resources may be frequency bands/channels which are shared between MNOs based on an inter-MNO negotiation or a technical standard, and the like. The specific radio resource may be selected from the MNO-common resources randomly or in accordance with a certain rule. For example, a frequency band/channel index corresponding to the specific radio resource may be determined based on a MNO ID (e.g., MNO1's ID), a UE ID (e.g., UE1.1's ID), a ProSe group ID or a ProSe service ID. The broadcast msg2 message may be transmitted in accordance with a periodic transmission cycle (e.g., N2 (N2≥1) radio frame(s)) and an offset (in unit of ms or subframe) during a procedure related to the broadcast msg2 is pending. The offset for transmission of the broadcast msg2 may be determined based on a MNO ID (e.g., MNO1 's ID), a UE ID (e.g., UE1.1's ID), a ProSe group II) or a ProSe service ID.

Even if allocation of Type resource 2 has a possible waste of radio resources (especially when there are no UE's competing for ProSe Connection setup), allocation of Type 2 resource can reduce the timespan until those UE's attempting to initiate ProSe Connection setup.

FIG. 11 shows a procedure for Inter-MNO ProSe connection setup in accordance with the present invention. FIG. 11 shows a case that multiple UEs are attempting the Inter-MNO ProSe connection setup. Basic procedure is substantially identical or similar to the case of FIG. 10, in which a single UE is attempting the Inter-MNO ProSe connection setup. Specifically, steps S1102~S1112 are basically corresponding to steps S1002~S1012 of FIG. 10.

Only, in the example of FIG. 11, it is possible that there are multiple UEs (UE2.1, UE3.1) that discovered a ProSe UE (e.g., UE1.1). In this case, collision is possible to happen in the response msg1 (e.g., ACK) phase and also in the phase of requesting ProSe Connection setup (marked as "ProSe Connection Request"). Specifically, collision of ACKs among multiple UEs is possible to happen. However, regardless ACKs are collided or not, ACK(s) is used for indication for discovered UE (e.g., UE1.1) that there is/are some ProSe-enabled UE(s) (e.g., UE2.1, UE3.1) who discovered UE1.1. Therefore, there is no need for discoverer UEs (e.g., UE2.1, UE 3.1) to retransmit their respective response msg1 (e.g., ACK). Also, collision of ProSe connection requests among multiple UEs is possible to happen. A ProSe connection request messages may include a (logical) ID of the respective discoverer UE (e.g., UE2.1 or UE3.1), and thus the collision of ProSe connection requests, if any, needs to be resolved to make a successful ProSe connection with discoveree UE (e.g., UE1.1) and discoverer UE (e.g., UE2.1, or UE3.1). The ID of the discoverer UE can include the MNO's (logical) ID, which is serving the UE: it can be the UE's HPLMN, or VPLMN.

When collision of ProSe connection requests occur, UE1.1. may not transmit any message in response to the ProSe connection request or may broadcast the broadcast msg2 again. After transmitting the ProSe connection request, UE2.1 (or UE3.1) fails to receive a message in response to the ProSe connection request within a receiving window (in unit of ms or subframe) or receives the broadcast msg2 again, UE2.1 (or UE3.1) may identify collision of ProSe connection requests. In this case, collision (or contention) resolution may be done by letting the competing ProSe UEs (e.g., UE2.1 and UE3.1) repeating the ProSe connection Request for a limited number of time. For repetition, back-off (length) can be applied: exponential back-off is an example. The MNO or discoveree UE (e.g., UE 1.1) may broadcast the maximum number of trials (ProSe connection request transmissions), back-off configuration (an initial back-off length, an increasing step-size per trial) information, and so on. SIB and/or ProSe-SIB can be used for this purpose, and this information can also be included in "[I'm Here] message" (e.g., broadcast msg2).

FIG. 12 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, for cooperative discovery (i.e., node cooperation) for the proximity-based service.

The invention claimed is:

1. A method of setting up a Proximity-based Service (ProSe) connection by a ProSe-enabled user equipment (UE) of a first Mobile Network Operator (MNO) in a cellular communication system, the method comprising:
broadcasting a first message including first resource allocation information for a first radio resource of the first MNO by using a specific radio resource which is available to ProSe-enabled UEs of a second MNO and a third MNO;
checking whether acknowledgement information regarding the first message is received from one or more ProSe-enabled UEs of the second MNO or the third MNO by using the first radio resource;
broadcasting a second message including second resource allocation information for a second radio resource of the first MNO by using the specific radio resource when the acknowledgement information regarding the first message is received by using the first radio resource;
receiving one or more ProSe connection requests as responses to the second message from the one or more ProSe-enabled UEs of the second MNO or the third MNO by using the second radio resource; and
broadcasting the second message by using the specific radio resource again, if any collision between the second MNO and the third MNO is detected from the one or more ProSe connection requests.

2. The method of claim 1, wherein the first message further includes at least one of a maximum number of trials for the acknowledgement information and a back-off configuration for the acknowledgement information.

3. The method of claim 1, wherein the second message further includes identity information for a sender of the second message and identity information for the second MNO or the third MNO.

4. The method of claim 3, wherein the second message further includes at least one of a maximum number of trials for the one or more ProSe connection requests and a back-off configuration for the one or more ProSe connection requests.

5. The method of claim 1, wherein the first MNO, the second MNO and the third MNO are different from each other.

6. A Proximity-based Service (ProSe)-enabled user equipment (UE) of a first Mobile Network Operator (MNO) configured to set up a ProSe connection in a wireless communication system, the ProSe-enabled UE of the first MNO comprising:
a radio frequency (RF) unit; and
a processor, wherein the processor is configured to:
broadcast a first message including first resource allocation information for a first radio resource of the first MNO by using a specific radio resource which is available to ProSe-enabled UEs of a second MNO and a third MNO,
check whether acknowledgement information regarding the first message is received from one or more ProSe-enabled UEs of the second MNO or the third MNO by using the first radio resource, broadcast a second message including second resource allocation information for a second radio resource of the first MNO by using the specific radio resource when the acknowledgement information regarding the first message is received by using the first radio resource, receive one or more ProSe connection requests as responses to the second message from the one or more ProSe-enabled UEs of the second MNO or the third MNO by using the second radio resource, and broadcast the second message by using the specific radio resource again, if any collision between the second MNO and the third MNO is detected from the one or more ProSe connection requests.

7. The ProSe-enabled UE of the first MNO of claim 6, wherein the first message further includes at least one of a maximum number of trials for the acknowledgement information and a back-off configuration for the acknowledgement information.

8. The ProSe-enabled UE of the first MNO of claim 6, wherein the second message further includes identity information for a sender of the second message and identity information for the second MNO or the third MNO.

9. The ProSe-enabled UE of the first MNO of claim 8, wherein the second message further includes at least one of a maximum number of trials for the one or more ProSe connection requests and a back-off configuration for the one or more ProSe connection requests.

10. The ProSe-enabled UE of the first MNO of claim 6, wherein the first MNO, the second MNO and the third MNO are different from each other.

* * * * *